United States Patent
Nishimura et al.

(12)

(10) Patent No.: US 6,194,533 B1
(45) Date of Patent: *Feb. 27, 2001

(54) LINER FILM FOR BULK CONTAINER AND CONTAINER LINER

(75) Inventors: Toshihiro Nishimura; Hiroshi Inoue; Yoichiro Tsuji, all of Ichihara; Takashi Hiraoka, Sue-cho, all of (JP)

(73) Assignees: Mitsui Chemicals Inc., Tokyo; Kyushu-Taiyoukasei Ltd., Kasuya Fukuoka, both of (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/049,909

(22) Filed: Mar. 30, 1998

(30) Foreign Application Priority Data

Mar. 31, 1997 (JP) .................................................. 9-080025

(51) Int. Cl.$^7$ .................................................. C08F 210/16
(52) U.S. Cl. ...................... 526/348.1; 526/348; 526/352; 383/120; 493/189; 493/243; 493/934; 525/240
(58) Field of Search ................................ 526/348, 348.1, 526/348.2, 348.4, 348.5, 348.6, 352; 383/120; 493/189, 243, 934; 525/240

(56) References Cited

U.S. PATENT DOCUMENTS

| 5,459,217 | * | 10/1995 | Todo et al. | 526/348.1 |
| 5,511,681 | * | 4/1996 | Podd | 220/403 |
| 5,580,914 | * | 12/1996 | Falla et al. | 524/257 |
| 5,618,254 | * | 4/1997 | Derby | 493/197 |
| 5,710,224 | * | 1/1998 | Alt et al. | 526/160 |
| 5,770,664 | * | 6/1998 | Okumura et al. | 526/127 |
| 5,874,513 | * | 2/1999 | Watanabe et al. | 526/348.1 |

FOREIGN PATENT DOCUMENTS

| 0587365 | | 9/1993 | (EP) . |
| 587365A2 | * | 3/1994 | (EP) . |
| 0764679 | | 3/1997 | (EP) . |
| 0769523 | | 4/1997 | (EP) . |
| 769523A2 | * | 4/1997 | (EP) . |
| 0781789 | | 7/1997 | (EP) . |
| 781789A2 | * | 7/1997 | (EP) . |
| 9414855 | | 7/1994 | (WO) . |
| 9510566 | | 4/1995 | (WO) . |
| WO95/10566 | * | 4/1995 | (WO) . |

* cited by examiner

Primary Examiner—David W. Wu
Assistant Examiner—R. Rabago

(57) ABSTRACT

Disclosed is a liner film for bulk container, which comprises a polyethylene (A) prepared by the use of a single site olefin polymerization catalyst such as a metallocene catalyst, said polyethylene (A) having a density of 0.920 to 0.940 g/cm$^3$, MFR of 0.1 to 3.0 g/10 min and a melting point of 115 to 135° C. When the film is heat-sealed, its sealed portion preferably has a tensile strength at break (Ts) of 2.0 to 4.0 kg/15 mm and a tensile elongation at break (EL) of 150 to 600%. The liner film for bulk container has the advantages: the film can be made lightweight by decreasing the film thickness; the film shows such a high heat-sealing strength that the heat-sealed portion is not broken even if no adhesive tape is attached thereto; and a bulk container liner formed from the film can be filled with a content of a higher temperature than the conventional temperature. Also disclosed is a bulk container liner shaping the above film into a bag.

8 Claims, 1 Drawing Sheet

LINER FILM FOR BULK CONTAINER AND CONTAINER LINER

FIELD OF THE INVENTION

The present invention relates to liner films for containers used for bulk transportation, and more particularly to films for producing liners installed bulk containers to transport or store granular or particulate chemicals or plastics, foods such as sugar and grains, etc.

The present invention also relates to liners for bulk container (BCL).

DESCRIPTION OF THE RELATED ART

Liner films for bulk containers are generally prepared by molding synthetic resins into tubular shape by an inflation molding method. Because the bulk containers are usually in the shape of rectangular parallelepiped, the liner films are sealed at both ends to the sizes of the containers to prepare bags, whereby container liners are produced. The liner is gusseted and folded to stock. Through the gusseting, the tubular films are provided with fold. The fold is called "gusset centerline portion". In the gusseted films, the portion other than the gusset centerline portion is generally called "original film portion".

As the liner film for a large-sized bulk container having a length of 20 feet (about 6.1 m) or 40 feet (about 12.2 m), for example, a single-layer or multi-layer film with a thickness of about 140 to 200 $\mu$m, which is formed from an ethylene/vinyl acetate copolymer having a vinyl acetate content of 1 to 5%, has been conventionally employed.

When the bulk container liners are filled with contents such as granular or particulate chemicals or foods (e.g., sugar, grains), overlapped portion of the both ends of the film of the liner are generally heat-sealed to seal. As for the conventional liner films for bulk containers, however, the adhesive strength of the heat-sealed portions is not always sufficient, and there remains insecurity of practical use. Therefore, the heat-sealed portions are reinforced by attaching adhesive tapes thereto. The conventional liner films are thick and have a thickness of about 140 $\mu$m, and the liners made of the films become heavy, so that it is not easy to fit the liners into the bulk containers. Further, since the liner films have a melting point of about 90° C., it is impossible to fill the liners made of the films with the high temperature contents at the temperature of as they are. For the filling, the contents must be cooled to, for example, not higher than 50° C.

As described above, the conventional liner films for bulk containers and the container liners have various problems in the practical use, and improvements of the liner films and the container liners have been eagerly desired.

The present invention is intended to solve such problems associated with the liners as described above, and it is an object of the invention to provide a liner film for bulk container, which can reduce the weight of liner by decreasing the film thickness, which shows such a high heat-sealing strength that the heat-sealed portion is not broken even if no adhesive tape is attached thereto, and which can produce a liner having heat resistance as capable of being filled with a content kept at a higher temperature than the conventional temperature.

It is another object of the invention to provide a bulk container liner, which is lightweight, has a high heat-sealing strength and is capable of being subjected to high-temperature filling.

SUMMARY OF THE INVENTION

The liner film for bulk container according to the invention is a film comprising a polyethylene (A) prepared by the use of a single site olefin polymerization catalyst, said polyethylene (A) having:

(i) a density of 0.920 to 0.940 g/cm$^3$, (ii) a melt flow rate (ASTM D-1238, 190° C., load of 2.16 kg) of 0.1 to 3.0 g/10 min, and (iii) a melting point (Tm) of 115 to 135° C.

The bulk container liner according to the invention is obtained by shaping an inflation film, which comprises the above-mentioned polyethylene (A) prepared by the use of a single site olefin polymerization catalyst, into a bag.

DETAILED DESCRIPTION OF THE PREFERRED EMBODIMENTS

Figure 1:
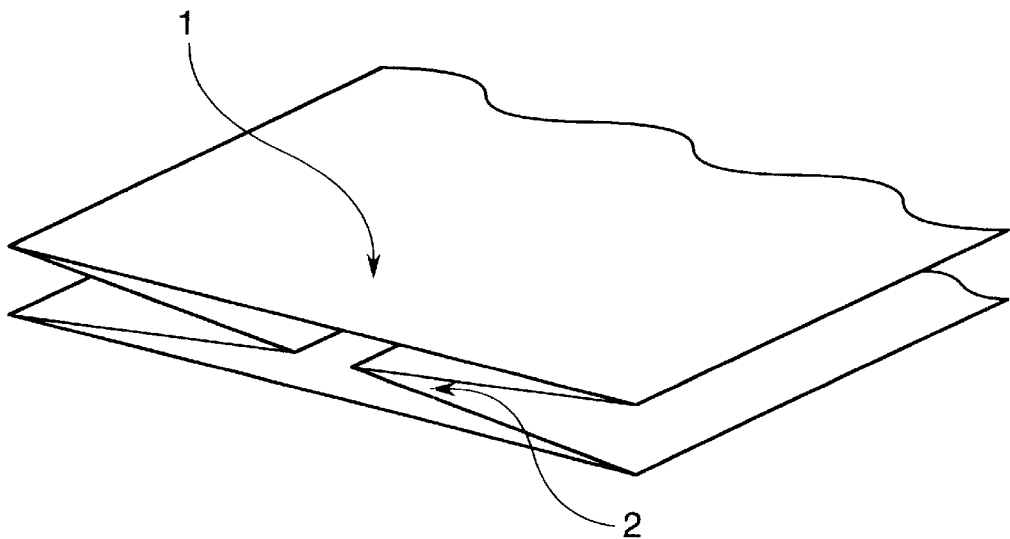
FIG. 1 is a schematic sectional view of the gusseted bulk container liner film according to the present invention.

The liner film for bulk container and the bulk container liner according to the invention are described in detail hereinafter.

The liner film for bulk container according to the invention is a film comprising a polyethylene (A).

(1) Polyethylene (A)

The polyethylene (A) for use in the invention is an ethylene homopolymer prepared by the use of a single site olefin polymerization catalyst or an ethylene/$\alpha$-olefin copolymer obtained by copolymerizing ethylene and an $\alpha$-olefin having 3 to 20 carbon atoms in the presence of a single site catalyst. The ethylene homopolymer and the ethylene/$\alpha$-olefin copolymer may have a branched molecular structure or a straight-chain molecular structure.

Examples of the $\alpha$-olefins having 3 to 20 carbon atoms employable for the copolymerization with ethylene include propylene, 1-butene, 1-pentene, 1-hexene, 4-methyl-1-pentene, 1-octene, 1-decene and 1-dodecene. Of these, preferable are $\alpha$-olefins having 3 to 10 carbon atoms, and particularly preferable are $\alpha$-olefins having 4 to 8 carbon atoms. These $\alpha$-olefins can be used singly or in combination of two or more kinds.

In the ethylene/$\alpha$-olefin copolymer used in the invention, it is desirable that the constituent units derived from ethylene are present in amounts of not less than 50% by weight and less than 100% by weight, preferably 75 to 99% by weight, more preferably 75 to 95% by weight, particularly preferably 83 to 95% by weight, and the constituent units derived from the $\alpha$-olefin of 3 to 20 carbon atoms are present in amounts of not more than 50% by weight, preferably 1 to 25% by weight, more preferably 5 to 25% by weight, particularly preferably 5 to 17% by weight.

The recurring unit or monomer content constituting the polyethylene (A) can be determined by measuring a $^{13}$C-NMR spectrum in the following manner. In a sample tube having a diameter of 10 mm, about 200 mg of a sample of the polyethylene (A) is homogeneously dissolved in 1 ml of hexachlorobutadiene, and a $^{13}$C-NMR spectrum of the solution is measured under the measuring conditions of a measuring temperature of 120° C., a measuring frequency of 25.05 MHz, a spectral width of 1,500 Hz, a pulse repetition time of 4.2 sec and a pulse width of 6 $\mu$sec.

The polyethylene (A) for use in the invention has a density (ASTM D-1505) of 0.920 to 0.940 g/cm³, preferably 0.922 to 0.938 g/cm³, more preferably 0.924 to 0.935 g/cm³. When the polyethylene (A) having a density in this range is used, a film having excellent heat-sealing strength properties can be obtained. Consequently, there can be omitted a step of attaching an adhesive tape to the heat-sealed portion to reinforce the portion, said step being generally carried out in the conventional process for preparing liners or filling contents.

The polyethylene (A) has a melt flow rate (ASTM D-1238, 190° C., load of 2.16 kg) of 0.1 to 3.0 g/10 min, preferably 0.3 to 2.0 g/10 min, more preferably 0.5 to 1.0 g/10 min. The polyethylene (A) having a melt flow rate in this range has excellent film-forming properties in the inflation molding with air cooling. In other words, this polyethylene has excellent film extrusion properties and bubble stability in inflation step, and therefore, films free from surface roughening can be produced at a high molding speed.

The polyethylene (A) has a melting point (Tm) of 115 to 135° C., preferably 117 to 135° C., in order to, for instance, filling chemicals produced at high temperature into liner. When the polyethylene (A) having a melting point in this range is used, a bulk container liner capable of being filled with a content of a higher temperature than the conventional temperature can be obtained. For example, even if a high temperature content immediately after production is not cooled to a low temperature as required to the conventional liner, the content can be filled in the liner. That is, the content can be filled in the liner by cooling it to about 80° C. Contrary to this, when using the conventional liner, the content can not be filled unless it is cooled to about 50° C. Accordingly, the time for cooling the content can be reduced, and as a result, the total time required for filling the content in the liner can be reduced and the filling operation can be efficiently carried out.

The melting point (Tm) referred to herein is a temperature at the maximum peak position in an endothermic curve measured by a differential scanning calorimeter (DSC), and can be found in the endothermic curve which is obtained by heating about 5 mg of a sample in an aluminum pan up to 200° C. at a rate of 10° C./min, maintaining the sample at 200° C. for 5 minutes, then cooling it to room temperature at a rate of 20° C./min and heating it at a rate of 10° C./min. In the measurement, a measuring device of DSC-7 type available from Perkin Elmer Co. is employed.

In the polyethylene (A), the ratio (Mw/Mn) of the weight-average molecular weight (Mw) to the number-average molecular weight (Mn) measured by GPC using o-dichlorobenzene as a carrier at a column temperature of 140° C. is in the range of preferably 1.5 to 4.0, particularly preferably 1.5 to 3.5. The Mw/Mn ratio is an index of a molecular weight distribution. The polyethylene (A) having the ratio in the above range shows a narrow molecular weight distribution, and from such polyethylene, not only a tough film having excellent impact resistance but also a film of good appearance free from surface roughening can be obtained. Further, because of small amount of a low-molecular weight component, bleeding of the low-molecular weight component from the film to stain a content filled in the liner hardly takes place. Moreover, blocking of films hardly takes place, and therefore, the films produced from the polyethylene can be favorably stored until they are used as liners, and the folded liners can be advantageously expanded with air prior to filling the content.

The polyethylene (A) can be prepared by homopolymerizing ethylene or copolymerizing ethylene and an α-olefin having 3 to 20 carbon atoms in the presence of a single site olefin polymerization catalyst, for example, a metallocene type olefin polymerization catalyst containing a metallocene catalyst component described in U.S. Pat. No. 5,459,217, U.S. Pat. No. 5,371,146, Japanese Patent Laid-Open Publication No. 136196/1994 and U.S. Pat. No. 5,464,905, or in the presence of a Brookhalt olefin polymerization catalyst.

The metallocene type catalyst is generally formed from (a) a metallocene catalyst component comprising a Group IVB transition metal compound containing at least one ligand having cyclopentadienyl skeleton, (b) an organoaluminum oxy-compound catalyst component, (c) a fine particle carrier, and optionally, (d) an organoaluminum compound catalyst component and (e) an ionizing ionic compound catalyst component.

The metallocene catalyst component (a) preferably used in the invention is a Group IVB transition metal compound containing at least one ligand having cyclopentadienyl skeleton. The transition metal compound is, for example, a compound represented by the following formula [I]:

$$ML^1_x \qquad [I]$$

wherein x is a valence of a transition metal atom M.

M is a transition metal atom selected from Group IVB of the periodic table, specifically zirconium, titanium or hafnium. Of these, zirconium is preferable.

$L^1$ is a ligand coordinated to the transition metal atom M. At least one ligand $L^1$ is a ligand having cyclopentadienyl skeleton.

Examples of the ligands $L^1$ having cyclopentadienyl skeleton coordinated to the transition metal atom M include a cyclopentadienyl group; alkyl-substituted cyclopentadienyl groups, such as a methylcyclopentadienyl group, a dimethylcyclopentadienyl group, a methylethylcyclopentadienyl group and a n-butylcyclopentadienyl group; an indenyl group; a 4,5,6,7-tetrahydroindenyl group; and a fluorenyl group. These groups may be substituted with halogen atoms, trialkylsilyl groups or the like.

When the compound represented by the formula [I] contains two or more groups having cyclopentadienyl skeleton, two of them may be bonded to each other through an alkylene group such as ethylene or propylene, a silylene group, or a substituted silylene group such as a dimethylsilylene group, a diphenylsilylene group or a methylphenylsilylene group.

The organoaluminum oxy-compound catalyst component (b) preferably used is aluminoxane. Specifically, there can be mentioned methylaluminoxane, ethylaluminoxane or methylethylaluminoxane, each having usually 3 to 50 repeating units represented by the formula —Al(R)O— (R is an alkyl group). The aluminoxane may be soluble or insoluble in benzene.

The fine particle carrier (c) used for preparing the olefin polymerization catalyst is an inorganic or organic compound, and is a particulate or granular solid having a particle (or granule) diameter of usually 10 to 300 μm, preferably 20 to 200 μm. The inorganic carrier is preferably a porous oxide, and examples thereof include $SiO_2$, $Al_2O_3$, MgO, $ZrO_2$ and $TiO_2$.

Examples of the organoaluminum compound catalyst component (d) optionally used for preparing the olefin polymerization catalyst include trialkylaluminums, such as trimethylaluminum, triethylaluminum and triisobutylaluminum; dialkylaluminum halides, such as dimethylaluminum chloride; and alkylaluminum sesquihalides, such as methylaluminum sesquichloride.

Examples of the ionizing ionic compound catalyst component (e), optionally used, include Lewis acid described in, for example, U.S. Pat. No. 5,321,106, such as triphenylboron, $MgCl_2$, $Al_2O_3$ and $SiO_2$—$Al_2O_3$; ionic compounds, such as triphenylcarbeniumtetrakis (pentafluorophenyl)borate; dodecaborane; and carborane compounds, such as bis-n-butylammonium(1-carbedodeca) borate.

The polyethylene (A) for use in the invention can be obtained by homopolymerizing ethylene or copolymerizing ethylene and an α-olefin having 3 to 20 carbon atoms in the presence of the olefin polymerization catalyst in a gas phase or a liquid phase such as slurry or solution under various conditions. For example, the polymerization temperature is in the range of −50 to 100° C. in the slurry polymerization, it is in the range of −50 to 500° C. in the solution polymerization, and it is in the range of 0 to 120° C. in the gas phase polymerization. The polymerization pressure is in the range of ordinary pressure to 100 kg/cm$^2$.

The molecular structure of the copolymer obtained above is straight-chain or has a main chain with short-chain branches or long-chain branches depending on the preparation conditions, particularly the type of the polymerization catalyst.

To the polyethylene (A), other polyolefins such as low-density polyethylene produced by radical polymerization under high pressure can be appropriately added. In order to improve film extrusion properties or improve rigidity and strength of the film, it is particularly effective to blend 80 to 100% by weight of the polyethylene (A) with 0 to 20% by weight of a low-density polyethylene. The low-density polyethylene is preferably a polyethylene having a density of 0.915 to 0.924 g/cm$^3$ and MFR of 0.1 to 2.0 g/10 min.

To the polyethylene (A), various additives such as antioxidant, heat stabilizer, weathering stabilizer, antistatic agent, filler and slip agent can be appropriately added, within limits not prejudicial to the objects of the invention.

(2) Film and Liner

The liner film for bulk container according to the invention is a film produced from the polyethylene (A) by an inflation film molding method, and is preferably subjected to gusseting to prepare folded liners. That is, the polyethylene (A) is fed to an inflation film molding machine equipped with an extruder having a screw of low compression ratio at compression zone, which is suitable for molding linear low-density polyethylene (L-LDPE), then extruded through a circular die at a resin temperature of 160 to 220° C. and air-cooled from outside while inflating with air pressure, to continuously produce a tubular bubble film. Before the bubble film is interposed between a pair of pinch rolls, the bubble of the film is pressed from the right and left sides with a pair of gusseters to almost fully gusset the film. The film is then interposed between the pinch rolls to fold the film in the shape of flat plate and is taken up by a take-up machine.

FIG. 1 is a schematic sectional view of the gusseted liner film, wherein the inflation molded film 1 is gusseted from diameter direction toward center thereof to form gusset centerline portion 2.

Figure 2:
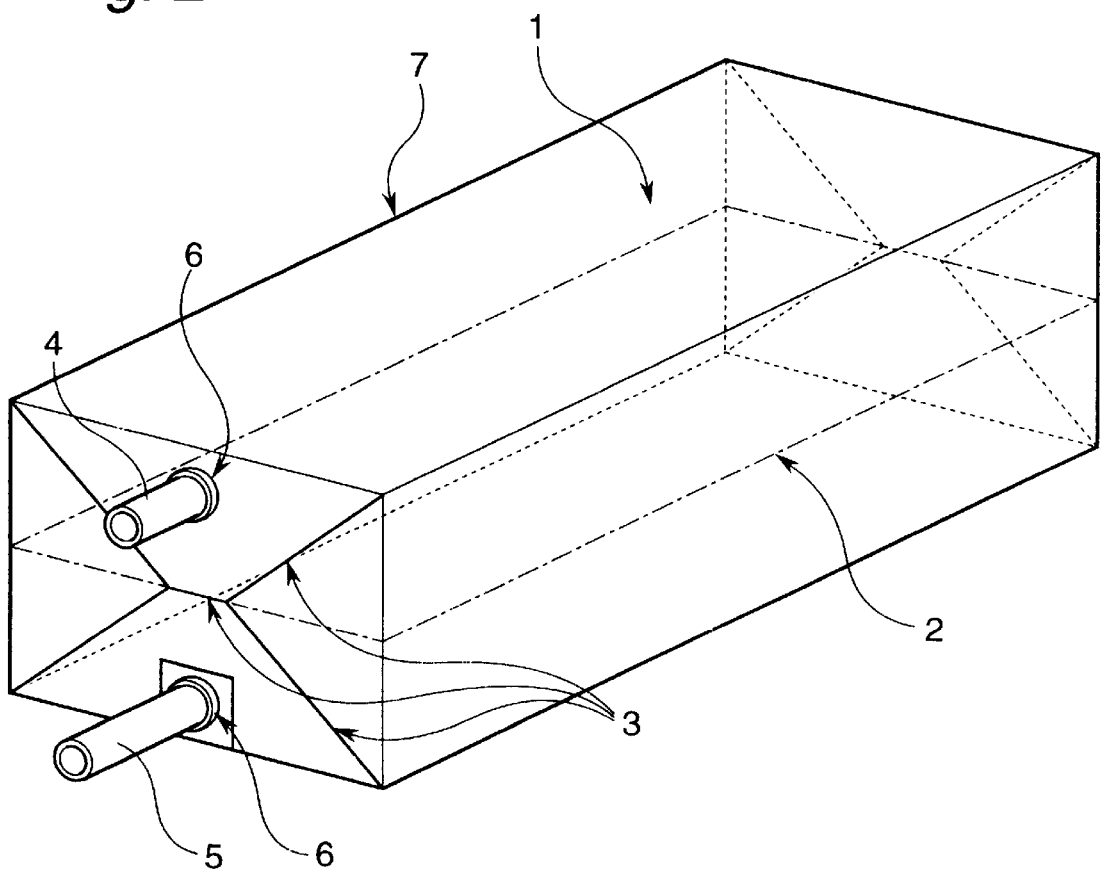
FIG. 2 is a perspective view of the one embodiment of the bulk container liner according to the present invention.

The gusseted film is cut to have a given length that is longer than the length of the container, then both ends of longitudinal direction thereof are sealed to form a liner. FIG. 2 is a perspective view of an embodiment of the liner, wherein the both ends of longitudinal direction of the film are folded, and the overlapped portions are heat-sealed together at a temperature of usually 130 to 200° C. to form heat-sealed portion 3. As the result, the tubular film becomes a closed bag by forming the heat-sealed portion 3 at the both ends of the film 1. Further, on one end of the bag, an inlet 4 to introduce a content therein and an outlet 5 to discharge a content therefrom are fixed on the film 1 by means of the heat sealing seals 6. Thus, inlet 4 and outlet 5 are provided to complete a liner 7.

The liner film for bulk container according to the invention has a thickness of usually 100 to 200 μm, though the thickness is properly determined according to the size of the bulk container, the kind and weight of a content to be filled in the liner, etc.

The liner film is shaped into a liner, and the liner is fitted into the container and filled with a content. Therefore, the liner film desirably has the following properties according to the intended use. If the film has the following property value, it can be advantageously used to form a bulk container liner having satisfactory mechanical properties.

(1) When the film is heat-sealed, the heat-sealed portion preferably has a tensile strength at break (Ts) of 2.0 to 4.0 kg/15 mm and a tensile elongation at break (EL) of 150 to 600%.

(2) When the film is gusseted, the original film portion preferably has a tensile strength at break (Ts) in the machine direction (M.D.) of 4.0 to 9.0 kg/15 mm, a tensile strength at break (Ts) in the transverse direction (T.D.) of 4.0 to 8.0 kg/15 mm, a tensile elongation at break (EL) in the machine direction of 300 to 900%, a tensile elongation at break (EL) in the transverse direction of 300 to 800% and a dart impact strength of not less than 700 g/mm, and the gusset centerline portion preferably has a tensile strength at break (Ts) in the machine direction of 3.5 to 8.5 kg/15 mm, a tensile strength at break (Ts) in the transverse direction of 3.5 to 8.5 kg/15 mm, a tensile elongation at break (EL) in the machine direction of 300 to 800%, a tensile elongation at break (EL) in the transverse direction of 300 to 800% and a dart impact strength of not less than 650 g/mm.

EFFECT OF THE INVENTION

The liner film for bulk container according to the invention is formed from the polyethylene (A) prepared by the use of a single site olefin polymerization catalyst and having specific density, melt flow rate and melting point. Therefore, the liner film is excellent in mechanical strength properties, such as a tensile strength at break (Ts) and a dart impact strength at the original film portion, a tensile strength at break (Ts) at the gusset centerline portion, and a tensile strength at break (Ts) at the sealed portion. Particularly, the liner film is characterized in that the strength of the gusset centerline portion is kept higher than that of the conventional polyethylene or ethylene/vinyl acetate copolymer.

Accordingly, the thickness of the liner film for bulk container can be made smaller than the thickness (e.g., 140 μm) of the conventional liner film as the mechanical strength properties are excellent. That is, the thickness of the liner film of the invention can be decreased to, for example, 100 to 120 μm. Consequently, the liner for bulk container of the invention can be made more lightweight than the conventional liner for bulk container, and thereby the liner can be fitted into a bulk container in a high working efficiency with improved workability. Further, in the disposal of a waste liner, the quantity thereof can be decreased in such an amount attained by thining the film thickness.

There is also provided by the invention a liner for bulk container having the advantages: not only the thickness of the film can be decreased to thereby decrease the liner weight; but also the film shows such a high strength that the liner filled with the content is not broken even if no adhesive tape is attached to the heat-sealed portion since the heat-sealing strength between the films is high. And a liner formed from the film can be filled with a content of a high temperature even if the content is not sufficiently cooled as compared with the conventional filling temperature, that is, the liner can be filled with a content even if the content has a higher temperature than the conventional temperature.

Since the container liner of the invention is lightweight and has high mechanical strength, the container liner can be easily installed into a container and can be filled with a content of higher than the conventional temperature, thereby improving the facility of liner.

EXAMPLE

The present invention is further described with reference to the following examples, but it should be construed that the invention is in no way limited to those examples.

In the examples, properties of the films were measured in the following manner.

(1) Tensile strength at break (Ts) and tensile elongation at break (EL)

The gusseted film was subjected to a tensile test using a tensile tester of constant crosshead speed type (available from Instron Co.), to measure a tensile strength at break (Ts) and a tensile elongation at break (EL) at the original film portion and the gusset centerline portion in each of the machine direction (M.D.) and the transverse direction (T.D.).

Test conditions

Test piece: prepared in accordance with JIS Z-1707

Ambient temperature: 23° C.

Rate of pulling: 300 mm/min (2) Tensile strength at break (Ts) and tensile elongation at break (EL) at the sealed portion Heat sealing of the film was carried out at 160° C. using NEWLONG HS-33D Top Sealer (trade name, available from Tester Sangyo K.K.). Then, the film was subjected to a tensile test (JIS Z-1707) using a tensile tester of constant crosshead speed type (available from Instron Co.), to measure a tensile strength at break (Ts, sealing strength).

(3) Dart impact strength

A dart impact strength of a gusseted film at each of the original film portion and the gusset centerline portion was determined by dividing a value measured in accordance with ASTM D-1709B by a value of the film thickness and taking the obtained value as the dart impact strength (g/mm).

Reference Example 1

Preparation of Olefin Polymerization Catalyst

In 100 liters of toluene, 6.3 kg of silica having been dried at 250° C. for 10 hours was suspended. To the suspension, 41 liters of a toluene solution of methylaluminoxane (Al: 0.96 mol/liter) was dropwise added over a period of 1 hour. During the addition, the temperature of the system was maintained at 0° C., followed by performing reaction at 0° C. for 60 minutes. Then, the temperature was raised up to 95° C. over a period of 1.5 hours, and at this temperature, the reaction was conducted for 4 hours. The temperature was then lowered to 60° C., and the supernatant liquid was removed by decantation.

The resulting solid was washed twice with toluene and resuspended in 125 liters of toluene. To the system, 15 liters of a toluene solution of bis(n-butylcyclopentadienyl) zirconium dichloride (Zr: 42.7 mmol/liter) was dropwise added at 30° C. over a period of 30 minutes, and the reaction was further conducted at 30° C. for 2 hours. Then, the supernatant liquid was removed, and the remainder was washed twice with hexane, to obtain a solid catalyst containing zirconium in an amount of 6.2 mg based on 1 g of the solid catalyst.

Preparation of Prepolymerized Catalyst

To 300 liters of hexane containing 14 mol of triisobutylaluminum, 8.5 kg of the solid catalyst obtained above was added, and prepolymerization of ethylene was carried out at 35° C. for 7 hours. Thus, a prepolymerized catalyst wherein polyethylene produced by prepolymerization was contained in an amount of 3 g based on 1 g of the solid catalyst was obtained.

Polymerizatin of Ethylene

In a continuous type fluidized bed gas phase polymerization reactor, copolymerization of ethylene and 1-hexene was carried out in the presence of the above-obtained prepolymerized catalyst.

The resulting polyethylene (PE-1) had a 1-hexene unit content of 9.5% by weight, a density (ASTM D-1505) of 0.930 g/cm$^3$, a melt flow rate (ASTM D-1238, 190° C., load of 2.16 kg) of 0.9 g/10 min, a melting point (Tm, measured by DSC) of 129° C., and a Mw/Mn ratio of 3.5.

Example 1

The polyethylene obtained in Reference Example 1 was pelletized by an extruder and then molded by using an air-cooling inflation film molding machine under the following molding conditions, to prepare a film having a thickness of 120 μm.

Molding conditions

Molding machine: inflation film molding machine (diameter: 150 mm) available from DOLCI Co.

Screw: L/D=32

Die: 1,500 mm in diameter, 2.5 mm in lip width

Air ring: 2-gap type

Molding temperature: 180° C.

Take-up rate: 10 m/min

The film obtained above was measured on the tensile strength at break (Ts), tensile elongation at break (EL) and dart impact strength at the original film portion and the gusset centerline portion in the aforesaid manner. Further, the film was measured on the tensile strength at break (Ts) and tensile elongation at break (EL) at the sealed portion in the aforesaid manner.

The results are set forth in Table 1.

Comparative Example 1

A conventional liner film (thickness: 140 μm) for bulk container prepared from an ethylene/vinyl acetate copolymer was gusseted. The gusseted film was measured on the tensile strength at break (Ts), tensile elongation at break (EL) and dart impact strength at the original film portion and the gusset centerline portion in the aforesaid manner. Further, the film was measured on the tensile strength at break (Ts) and tensile elongation at break (EL) at the sealed portion in the aforesaid manner.

The results are set forth in Table 1.

TABLE 1

| Properties of film | Example 1 | Comparat. Example 1 |
|---|---|---|
| Original film portion | | |
| Tensile strength at break (kg/15 mm) | | |
| M.D. | 7.80 | 4.70 |
| T.D. | 7.59 | 5.32 |
| Tensile elongation at break (%) | | |
| M.D. | 830 | 420 |
| T.D. | 860 | 640 |
| Dart impact strength (g/mm) | 1000 | 300 |
| Gusset centerline portion | | |
| Tensile strength at break (kg/15 mm) | | |
| M.D. | 7.51 | 4.52 |
| T.D. | 7.59 | 5.17 |
| Tensile elongation at break (%) | | |
| M.D. | 810 | 400 |
| T.D. | 830 | 610 |
| Dart impact strength (g/mm) | 900 | 250 |
| Sealed portion | | |
| Tensile strength at break (kg/15 mm) | 3.03 | 2.54 |
| Tensile elongation at break (%) | 460 | 340 |

Example 2

An inflation film (diameter: about 1,530 mm, thickness: 120 μm) prepared in the same manner as in Example 1 was gusseted to obtain a flat film having a gusset width of 2,420 mm. The film was cut to have a length of about 8,300 mm. The both ends of the film were folded, and the overlapped portion of the film was heat-sealed to form a bag in the shape of rectangular parallelepiped having a length of about 5,900 mm, a width of about 2,500 mm and a height of about 2,400 mm. The rectangular parallelepiped bag was provided with an inlet to introduce a content therein and an outlet to discharge a content therefrom by means of heat sealing.

The folded film bag was installed into a container, and compressed air was blown to expand a liner in the shape of rectangular parallelepiped so as to conform with the shape of inner wall of the container. Then, high-purity terephthalic acid of about 80° C. was introduced into the liner. As a result, the liner was able to be filled with the terephthalic acid in a high working efficiency.

What is claimed is:

1. A bulk container liner of 20 to 40 feet in length having a shape of rectangular parallelepiped bag obtained by gusseting a tubular inflation film from diameter direction toward center thereof and sealing both ends of longitudinal direction which is provided with an inlet to introduce a content therein and an outlet to discharge a content therefrom by means of heat sealing, wherein the liner is formed from a polyethylene (A) prepared by the use of a single site olefin polymerization catalyst and having:
   (i) a density of 0.922 to 0.938 g/cm$^3$,
   (ii) a melt flow rate (ASTM D-1238, 190° C., load of 2.16 kg) of 0.3 to 2.0/10 min,
   (iii) a melting point (Tm) of 117 to 135° C., and
   (iv) a ratio of Mw/Mn of 1.5 to 3.5,
   wherein the polyethylene (A) is an ethylene/α-olefin copolymer comprising 75 to 95% by weight of ethylene and 5 to 25% by weight of an α-olefin having 3 to 20 carbon atoms, and
   wherein when the film is heat-sealed, the sealed portion has a tensile strength at break (Ts) of 2.0 to 4.0 kg/15 mm and a tensile elongation at break (EL) of 150 to 600%.

2. The bulk container liner as claimed in claim 1, wherein when the film is gusseted, the original film portion has a tensile strength at break (Ts) in the machine direction of 4.0 to 9.0 kg/15 min, a tensile strength at break (Ts) in the transverse direction of 4.0 to 8.0 kg/15 mm, a tensile elongation at break (EL) in the machine direction of 300 to 900% and a dart impact strength of not less than 700 g/mm, and the gusset centerline portion has a tensile strength at break (Ts) in the machine direction of 3.5 to 8.5 kg/15 mm, a tensile strength at break (Ts) in the transverse direction of 3.5 to 8.5 kg/15 mm, and a dart impact strength of not less than 650 g/mm.

3. A bulk container liner of 20 to 40 feet in length obtained by shaping an inflation film comprising a polyethylene (A) into a bag, said polyethylene (A) being prepared by the use of a single site olefin polymerization catalyst and which has:
   (i) a density of 0.920 to 0.940 g/cm$^3$,
   (ii) a melt flow rate (ASTM D-1238, 190° C., load of 2.16 kg) of 0.1 to 3.0 g/10 min, and
   (iii) a melting point (Tm) of 115 to 135° C.,
   wherein said liner being obtained by heat-sealing the film to form a heat-sealed portion, wherein the sealed portion has a tensile strength at break (Ts) of 2.0 to 4.0 kg/15 mm and a tensile elongation at break (EL) of 150 to 600%, and wherein the liner is obtained by gusseting the film to form an original film portion and a gusseted centerline portion, the original film portion has a tensile strength at break (Ts) in the machine direction of 4.0 to 9.0 kg/15 mm, a tensile strength at break (Ts) in the transverse direction of 4.0 to 8.0 kg/15 mm, and a dart impact strength of not less than 700 g/mm, and the gusset centerline portion has a tensile strength at break (Ts) in the machine direction of 3.5 to 8.5 kg/15 mm, a tensile strength at break (Ts) in the transverse direction of 3.5 to 8.5 kg/15 mm, and a dart impact strength of not less than 650 g/mm.

4. The liner as claimed in claim 3 in the form a parallelepiped bag obtained by inserting longitudinally extending folds into a generally tubular inflation molded film to form gussets which extend inwardly towards the bag's center, the bag having longitudinally opposed ends that are sealed and the bag also having heat-sealed thereto an inlet and an outlet for the introduction to and discharge from the liner of contents.

5. The liner as claimed in claim 3, wherein the polyethylene (A) is an ethylene/α-olefin copolymer comprising 75 to 99% by weight of units derived from ethylene and 1 to 25% by weight of units derived from an α-olefin of 3 to 20 carbon atoms.

6. The liner as claimed in claim 5 wherein the film comprises 80 to 100% by weight of an ethylene/α-olefin copolymer and 0 to 20% by weight of a high pressure low density polyethylene.

7. The liner as claimed in claim 4, wherein the polyethylene (A) is an ethylene/α-olefin copolymer comprising 75 to 99% by weight of units derived from ethylene and 1 to 25% by weight of units derived from an α-olefin having 3 to 20 carbon atoms.

8. The liner as claimed in claim 7, wherein the film comprises 80 to 100% by weight of an ethylene/α-olefin copolymer and 0 to 20% by weight of a high pressure low density polyethylene.

* * * * *